(12) United States Patent
Ubele et al.

(10) Patent No.: US 7,516,964 B2
(45) Date of Patent: Apr. 14, 2009

(54) CLAMPING CHUCK AND KEY ROD THEREFOR

(75) Inventors: Andre Ubele, Kleinaspach (DE); Siegfried Gulde, Durrenwaldstetten (DE)

(73) Assignee: Schunk GmbH & Co. KG Spann-und-Greiftechnik, Lauffen (DE)

( * ) Notice: Subject to any disclaimer, the term of this patent is extended or adjusted under 35 U.S.C. 154(b) by 385 days.

(21) Appl. No.: 10/539,601

(22) PCT Filed: Dec. 19, 2003

(86) PCT No.: PCT/EP03/14651

§ 371 (c)(1),
(2), (4) Date: Jan. 17, 2006

(87) PCT Pub. No.: WO2004/056516

PCT Pub. Date: Jul. 8, 2004

(65) Prior Publication Data

US 2006/0145432 A1    Jul. 6, 2006

(30) Foreign Application Priority Data

Dec. 20, 2002   (DE) ................................ 102 59 959

(51) Int. Cl.
*B23B 31/167* (2006.01)
(52) U.S. Cl. .......................................... 279/124; 279/6
(58) Field of Classification Search .................. 279/123, 279/124, 6, 110, 112, 121, 122, 125, 147
See application file for complete search history.

(56) References Cited

U.S. PATENT DOCUMENTS

| 1,594,716 | A | * | 8/1926 | Forkardt | 279/114 |
|---|---|---|---|---|---|
| 3,606,364 | A | * | 9/1971 | Benjamin et al. | 279/121 |
| 3,682,491 | A | * | 8/1972 | Sakazaki et al. | 279/124 |
| 4,007,943 | A | * | 2/1977 | Scharfen et al. | 279/121 |
| 4,200,300 | A | * | 4/1980 | Rohm | 279/124 |
| 4,243,236 | A | * | 1/1981 | Rohm | 279/110 |
| 4,243,237 | A | * | 1/1981 | Rohm | 279/121 |
| 4,506,896 | A | * | 3/1985 | Jackson et al. | 279/118 |
| 4,639,001 | A | * | 1/1987 | Berardo | 279/121 |
| 4,969,654 | A | * | 11/1990 | Theodolin | 279/119 |

(Continued)

FOREIGN PATENT DOCUMENTS

DE      29 49 566 A1    6/1981

(Continued)

*Primary Examiner*—David P Bryant
*Assistant Examiner*—Eric A Gates
(74) *Attorney, Agent, or Firm*—Berenato, White & Stavish, LLC

(57) ABSTRACT

A clamping chuck for machine tools comprising a chuck body and a plurality of clamping jaws which can be displaced together radially by means of a drive comprising key rods is disclosed. An actuating mechanism comprising a releasing bolt is rotatably positioned in the chuck body, and a releasing key can be coupled to the releasing bolt, in order to displace the key rod between an upper working position and a lower jaw changing position. The key rod comprises locking means which enable the releasing bolt to rotate out of the rotary position corresponding to the lower jaw changing position of the key rod, into the rotary position corresponding to the upper working position of the key rod, when the toothing of the coupling yoke is engaged with the counter-toothing of an associated clamping jaw.

7 Claims, 10 Drawing Sheets

U.S. PATENT DOCUMENTS

| | | | |
|---|---|---|---|
| 5,129,662 A * | 7/1992 | Kempken | 279/123 |
| 5,139,277 A * | 8/1992 | Howard et al. | 279/124 |
| 5,630,594 A * | 5/1997 | Bronzino et al. | 279/123 |
| 5,716,058 A * | 2/1998 | Bronzino et al. | 279/121 |
| 6,397,712 B1 | 6/2002 | Rohm | |

FOREIGN PATENT DOCUMENTS

| | | | |
|---|---|---|---|
| DE | 3603459 A1 * | 8/1987 | |
| DE | 40 16 775 C1 | 4/1991 | |
| DE | 43 35 896 A1 | 4/1995 | |
| DE | 195 02 363 C1 | 1/1996 | |
| DE | 19509976 C1 * | 8/1996 | |
| DE | 296 15 682 U1 | 11/1996 | |
| DE | 19837147 A1 * | 3/2000 | |
| EP | 1431003 A1 * | 6/2004 | |
| GB | 2025808 A * | 1/1980 | |
| JP | 01159108 A * | 6/1989 | |
| JP | 08229713 A * | 9/1996 | |
| JP | 08252705 A * | 10/1996 | |

* cited by examiner

CLAMPING CHUCK AND KEY ROD THEREFOR

The present invention concerns a powered clamping chuck for machine tools, in particular for lathes, having a chuck body and several clamping jaws that are arranged movably in radial jaw guides of the chuck body and are displaceable together, by means of a drive, radially with respect to the chuck axis, the drive including key bars that are slidably guided transversely to the chuck axis for displacement of the clamping jaws in the chuck body and each comprise a tooth set that is in engagement with a corresponding counter-tooth set on an associated clamping jaw; a positioning mechanism being provided that comprises a releasing bolt mounted rotatably in the chuck body and a releasing key that can be coupled to the releasing bolt in order to displace, by way of a rotation of the releasing bolt, the key bar or a coupling attachment, comprising the tooth set, of the key bar parallel to the chuck axis between an upper working position and a lower jaw changing position in which the tooth set of the key bar is pulled back out of the counter-tooth set of the clamping jaw and the latter can be removed radially from the chuck body; and a locking device being provided which locks the releasing key on the releasing bolt and permits disengagement of the releasing key only in the working position of the key bar. The invention further concerns a key bar for such a clamping chuck.

Clamping chucks of this kind for machine tools are known, and in practice are used principally on lathes in order to clamp the workpieces to be machined. Conventional clamping chucks comprise a dimensionally stable chuck body that has a central receiving opening for the workpieces, as well as several clamping jaws that are radially movable in jaw guides of the chuck body. In addition to manually actuatable manual clamping chucks, so-called powered clamping chucks, in which the clamping forces exerted by the clamping jaws on the workpiece are generated in motorized or hydraulic fashion, are often used in more complex machine tools, especially in program-controlled automatic lathes.

DE-A-43 35 896, for example, discloses a powered clamping chuck that operates on the principle of key bars that move in a straight line and are guided movably in key bar pockets provided transversely to the guide grooves for the clamping jaws. The key bars, which are driven by a cylinder arranged in the chuck body, are coupled to the clamping jaws via oblique tooth sets in such a way that the tangential motions of the key bars in the key bar pockets are converted into radial clamping motions of the clamping jaws.

With the known clamping chuck, each key bar can be axially displaced by way of an eccentric positioning member (eccentric bolt) that engages into the key bar and is rotatable from outside by means of a releasing key, so that the bar's tooth set comes out of engagement with the counter-tooth set of the associated clamping jaw, and the clamping jaw can be pulled radially out of the guide groove in the chuck body.

In another powered clamping chuck that is known from DE 40 16 775 C1, the key bars are held in axially displaceable fashion in a driving jaw displaceable radially with respect to the chuck axis. In this clamping chuck, the driving jaw is radially displaceable via a wedge hook coupling by means of an axially movable chuck piston in order to move the driving jaw together with the key bar, and the key bar can be moved parallel to the chuck axis with respect to the driving jaw in order to bring the latter out of engagement with the clamping jaw, so that the clamping jaw can be pulled out of the guide groove in the chuck body.

With the known powered clamping chucks, actuation of the eccentric bolts is accomplished via a releasing key that must be withdrawn again from the chuck body before the powered clamping chuck is put into service. For operating safety reasons, the known powered clamping chucks have a locking device which permits such withdrawal only when the eccentric bolt is in its operating position that corresponds to the working position of the key bar, but otherwise prevents withdrawal of the releasing key. This is intended to give the user a visual notification, by way of the releasing key inserted into the chuck body, that the powered clamping chuck is not yet in the operating state.

It is the object of the invention to develop a powered clamping chuck of the kind cited initially, and a key bar, in such a way that operating safety can be considerably enhanced.

This object is achieved, according to the present invention, in that the key bar has locking means that allow a rotation of the releasing bolt out of the rotational position corresponding to the lower jaw changing position of the key bar, into the rotational position corresponding to the upper working position of the key bar, if the tooth set of the coupling attachment is in engagement with the counter-tooth set of an associated clamping jaw, and that otherwise prevent rotation of the releasing bolt into the rotational position corresponding to the upper working position.

The invention is thus based on the idea of configuring powered clamping chucks in such a way that the eccentric bolt can be returned back to its starting position, in which the releasing key can be withdrawn, only when it is guaranteed that a clamping jaw is inserted into the corresponding jaw guide of the chuck body, and in particular that an overlap that is sufficient in terms of safety exists between the tooth sets of the clamping jaw and the key bar.

According to an embodiment of the invention, provision is made for the key bars each to have a key bar body and, held thereon, a coupling attachment on which the tooth set is provided, an eccentric bolt coupled to the releasing bolt being rotatably mounted in a transverse bore of the key bar body and carrying a radially projecting extension that, upon a rotation of the eccentric bolt, comes into engagement with a corresponding countersurface of the coupling attachment in order to displace the coupling attachment between the upper working position and the lower jaw changing position.

In an implementation of this embodiment of the invention, provision is made that the locking means include a snap-lock pin that is held slidably in a passthrough bore which extends, parallel to the direction of motion of the coupling attachment, from the tooth set of the coupling attachment through the coupling attachment and the key bar body to the transverse bore in which the eccentric bolt is arranged; and the locking means furthermore comprise a pusher element that is arranged slidably in a bore of the eccentric bolt and is pushed outward by a compression spring element braced in the bore, the bore of the eccentric bolt and the passthrough bore in which the snap-lock pin is held being located opposite one another in a predefined rotational position of the eccentric bolt, so that the pusher element is pushed by the preload force of the compression spring element into the passthrough bore and pushes the snap-lock pin out of the coupling attachment; a rotation of the eccentric bolt back into the starting position, and thus a return of the coupling attachment to its working position, then being prevented by the engagement of the pusher element into the passthrough bore; and the snap-lock pin being prevented from emerging from the key bar by the counter-tooth set of a clamping jaw that is mounted on the key bar and closes off the passthrough bore, so that the pusher element remains outside the passthrough bore and the eccentric bolt can be rotated back into its starting position.

In this embodiment, the coupling attachment is locked in the jaw changing position, and the eccentric bolt in its rotational position corresponding to the jaw changing position, if the pusher element that is held in the eccentric bolt engages into the passthrough bore in which the snap-lock pin sits. Engagement of the pusher element in this fashion is possible only if the upper end of the passthrough bore, which is positioned in the region of the tooth set of the key bar, is clear and the snap-lock pin can emerge from the key bar, i.e. if emergence is not prevented by a clamping jaw inserted into the corresponding jaw guide. If, on the other hand, such emergence of the snap-lock pin from the key bar is prevented by a clamping jaw, thus ensuring on the one hand that a clamping jaw is in fact inserted into the clamping jaw and on the other hand that the clamping jaw is also inserted sufficiently far into the jaw guide and the safety-relevant overlap of the tooth sets of the key bar and clamping jaw thus exists, the snap-lock pin prevents the pusher element of the eccentric bolt from entering the passthrough bore and thus ensures that the eccentric bolt can be rotated back into the starting position.

In a further implementation of this embodiment, provision is usefully made for the pusher element to be of beveled or rounded configuration in the region of its end surface that comes into contact with the snap-lock pin. This ensures that even in those cases in which the pusher element engages undesirably loosely into the passthrough hole, for example because of production tolerances, the beveled or rounded end surface acts as a runout bevel that coacts with an edge of the passthrough hole in order to slide the pusher element back into the eccentric bolt when the eccentric bolt is rotated back into its starting position.

In a further embodiment of the invention, the key bar extension can possess on its underside a guide extension that engages into a corresponding guide bore of the key bar body. The coupling attachment is preferably braced against the key bar body by way of compression springs and is pushed toward the clamping jaw. In this case provision is made, according to a preferred embodiment, for the countersurface of the key bar with which the extension of the eccentric bolt comes into engagement to be embodied on the guide extension.

Regarding further advantageous embodiments of the invention, the reader is referred to the dependent claims and to the description below of an exemplary embodiment making reference to the appended drawings. In the drawings:

Figure 1:
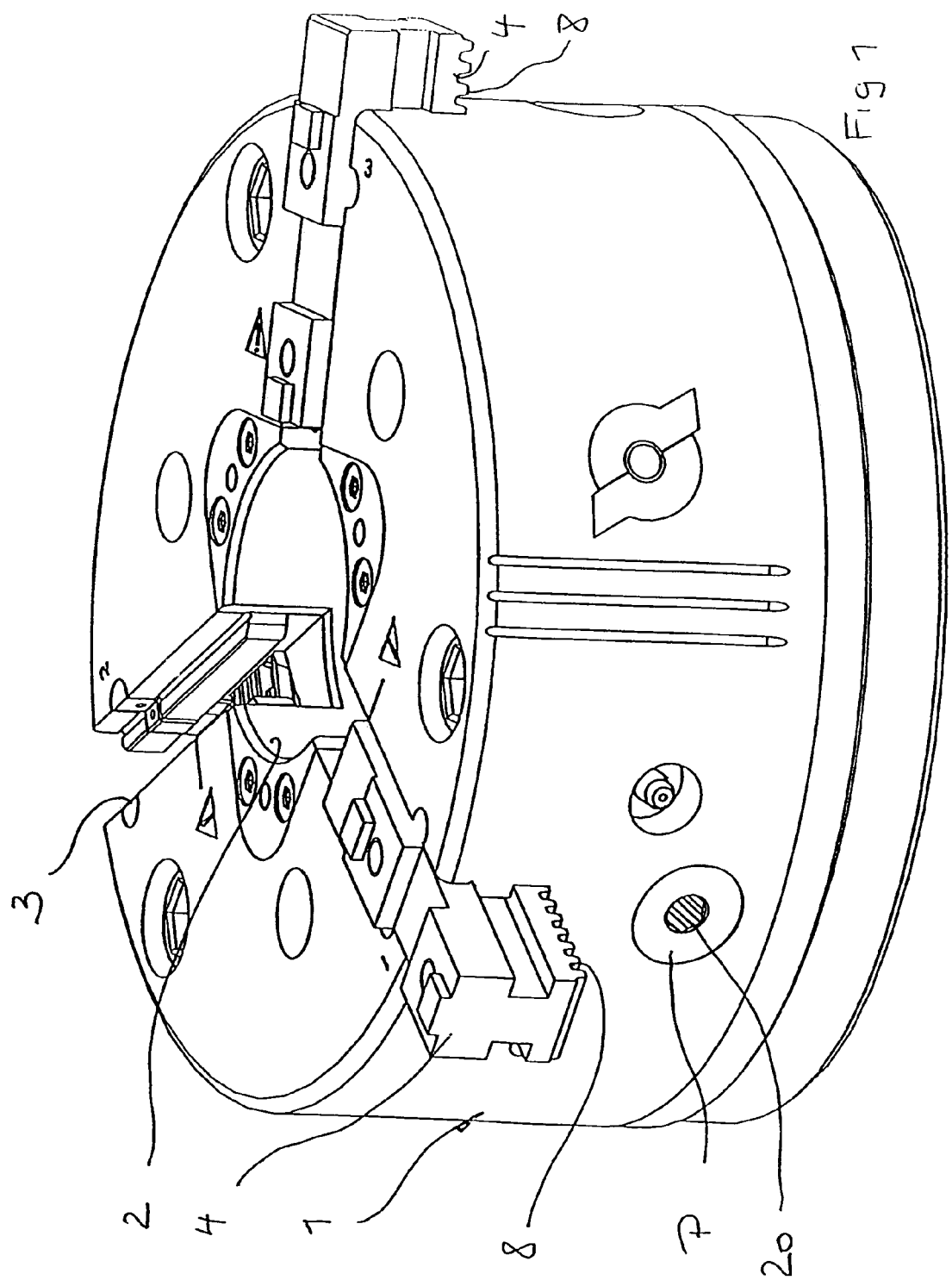
FIG. 1 is a perspective depiction of an embodiment of a clamping chuck according to the present invention.

FIGS. 1 through 5 depict an embodiment of a clamping chuck in accordance with the present invention that can be used, for example, to clamp workpieces in lathes. The clamping chuck includes a chuck body 1 of basically cylindrical shape that can be secured at its rear end surface to the spindle (not depicted) of a machine tool. The clamping chuck comprises a central opening 2 into which can be inserted a workpiece to be clamped.

The clamping chuck depicted is embodied in conventional fashion as a three-jaw chuck. Three radial jaw guides 3, which are distributed uniformly over the circumference (i.e. are arranged with an offset of 120° from one another), are correspondingly provided on the front end face of chuck body 1. Inserted into jaw guides 3 are clamping jaws 4 that can each comprise a base jaw and an attachable jaw that can be bolted thereonto. Only the respective base jaws of clamping jaws 4 are depicted in the drawings. The three clamping jaws 4 can be displaced inward and outward together by way of a key bar mechanism in order to clamp and release workpieces.

This key bar mechanism includes three key bars 5 that are each associated with one of the clamping jaws 4 and are held in chuck body 1 displaceably perpendicular to jaw guides 3. Concretely, key bars 5 each comprise an elongated key bar body 5*a* that is arranged displaceably in chuck body 1 and is equipped at its one end, located radially farther inward, with wedge surfaces 6 that extend obliquely with respect to chuck axis A and coact with corresponding wedge surfaces of a chuck piston K (merely indicated) in order to convert an axial motion of chuck piston K in chuck body 1 into a radial motion of key bar bodies 5*a*. Key bars 5 furthermore each have a coupling attachment 5*b* that carries on its front side a tooth set 7 which engages into a corresponding counter-tooth set 8 on the associated clamping jaw 4. In the Figures, key bar 5 and clamping jaw 4 are depicted in their coupled position. The decoupled position is not shown.

In the embodiment depicted, coupling attachments 5*b* are substantially plate-shaped and are inserted into a corresponding recess 9 on the upper side of the respective key bar body 5. Coupling attachment 5*b* engages, with two ear-shaped extensions 10 on its axial ends, into complementarily configured regions of recess 9 to form a positive engagement, so that coupling attachment 5*b* is at least substantially immovable with respect to key bar body 5*a* transversely to chuck axis direction A, and so that forces acting transversely to the chuck axis direction are directed via ear-shaped extensions 10 into key bar body 5*a*. This bracing of coupling attachment 5*b* on key bar body 5*a* prevents any tilting of coupling attachment 5*b*.

In chuck axis direction A, key bar attachments 5*b* are movable with respect to key bar bodies 5*a* between an upper working position and a lower jaw changing position. For that purpose, each coupling attachment 5*b* has on its underside a bolt-shaped guide extension 11 that engages into a corresponding guide bore 17 of key bar body 5*a*. It is clearly evident from the drawings that in the embodiment depicted, coupling attachment 5*b* is braced against key bar body 5*a* by way of two compression springs 15 that are arranged in key bar body 5*a* and that push coupling attachment 5*b*, via corresponding pusher pieces 16, toward clamping jaw 4 into the working position.

Figure 3:
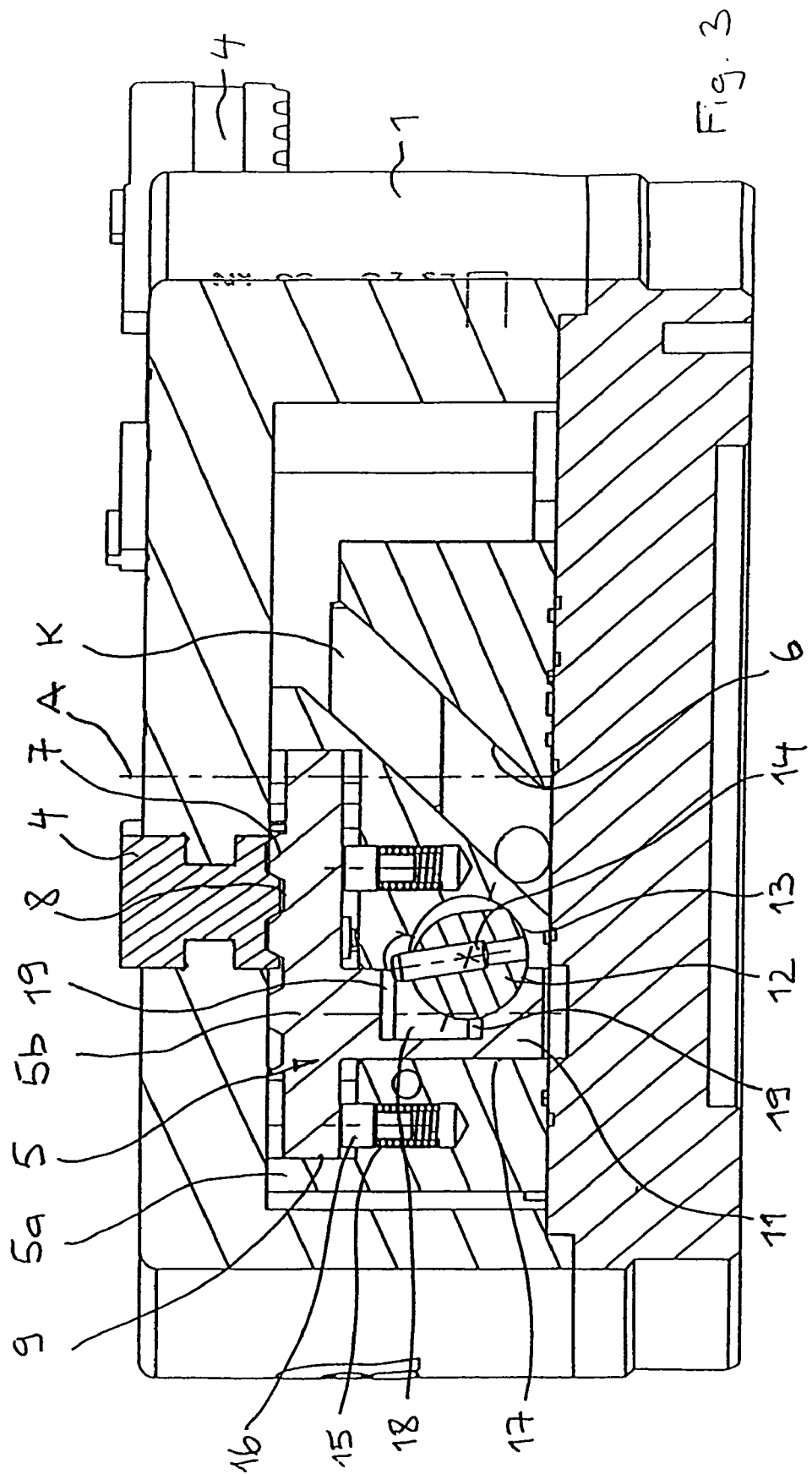
FIG. 3 shows the clamping chuck in section along line F-F in FIG. 2.
Figure 4:
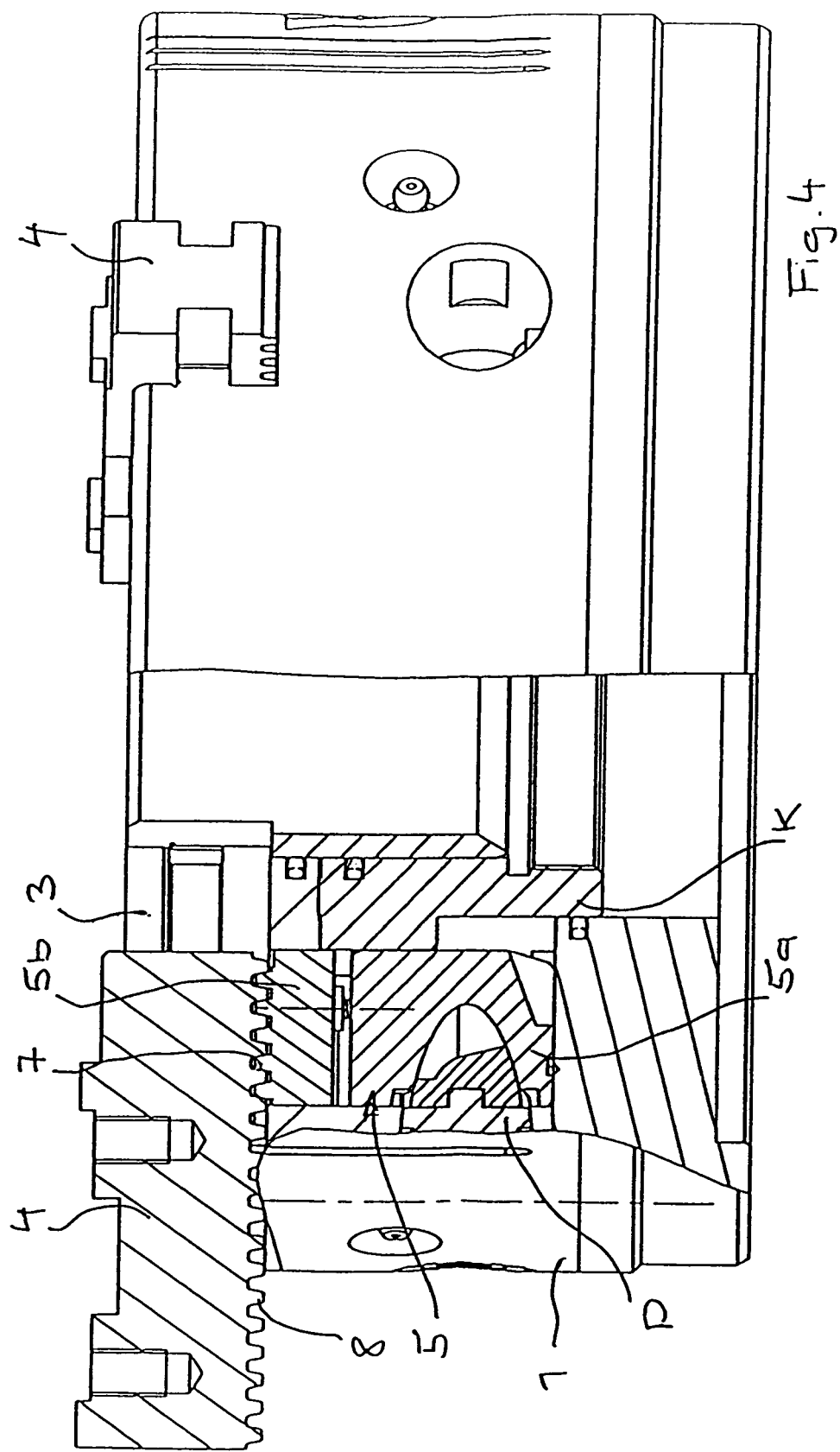
FIG. 4 is a side view of the clamping chuck of FIG. 2, with a partial section along line A-A in FIG. 2.
Figure 5:
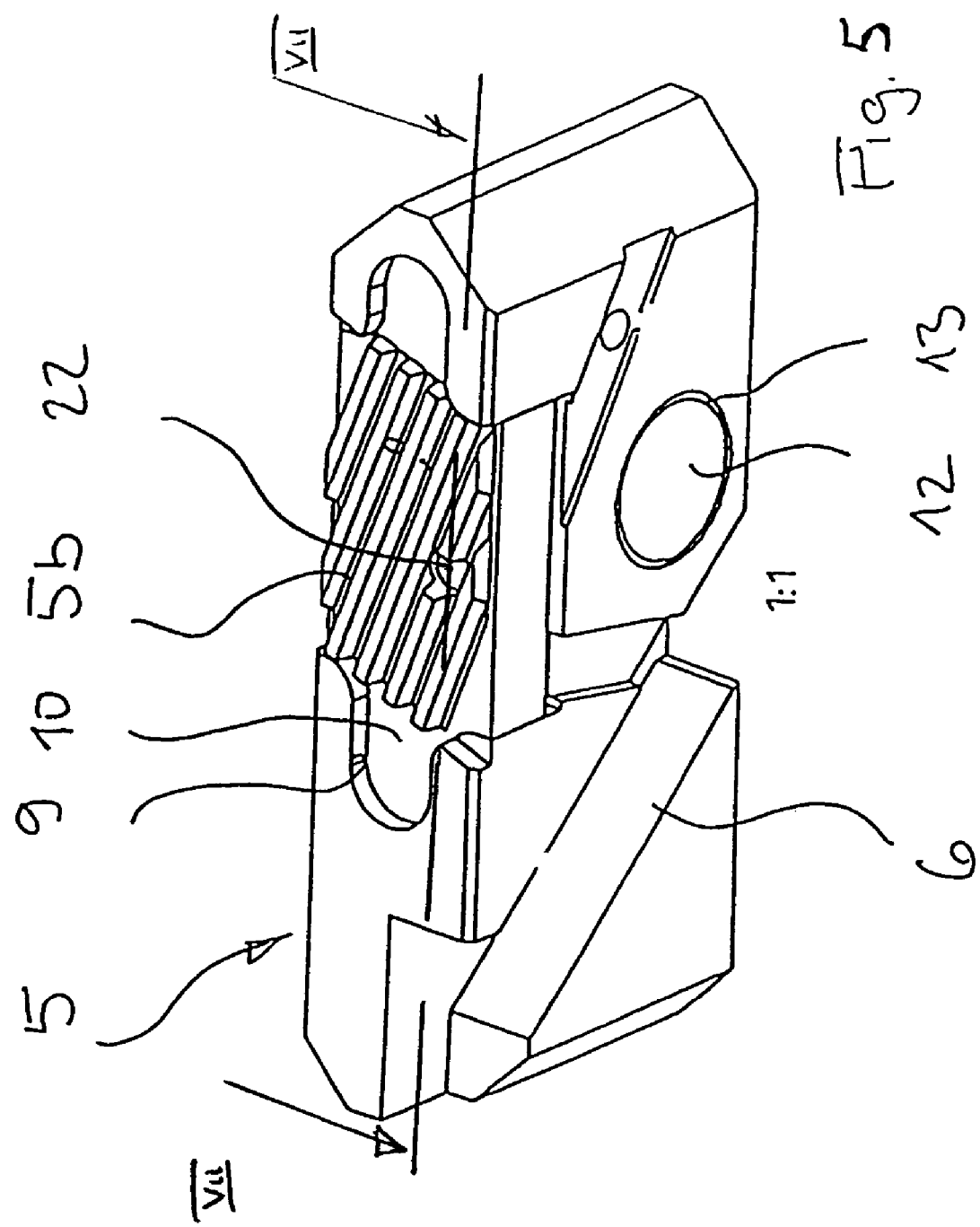
FIG. 5 is a perspective view of a key bar according to the present invention.

To allow coupling attachment 5*b* to be displaced out of the working or coupled position depicted in FIG. 3, in which its tooth set 7 is in engagement with counter-tooth set 8 of clamping jaw 4, into the lower jaw changing position, a positioning member is provided in the form of an eccentric bolt 12 that is mounted rotatably in a transverse bore 13 of key bar body 5*a* and carries, as an eccentric, an extension in the form of a pin 14 protruding radially from bolt 12. This pin 14 engages into a recess 18 of guide bolt 11 of coupling attachment 5b, and after a rotation of eccentric bolt 12 approximately 80° counterclockwise out of the position shown in FIG. 3, comes into engagement with a countersurface 19 of guide bolt 11, so that upon a further rotation, coupling attachment 5b is pushed downward until tooth set 7 of key bar 5 is pulled completely out of counter-tooth set 8 of clamping jaw 4, and clamping jaw 4 can be pulled in the radial direction out of jaw guide 3 in chuck body 1.

Figure 2:
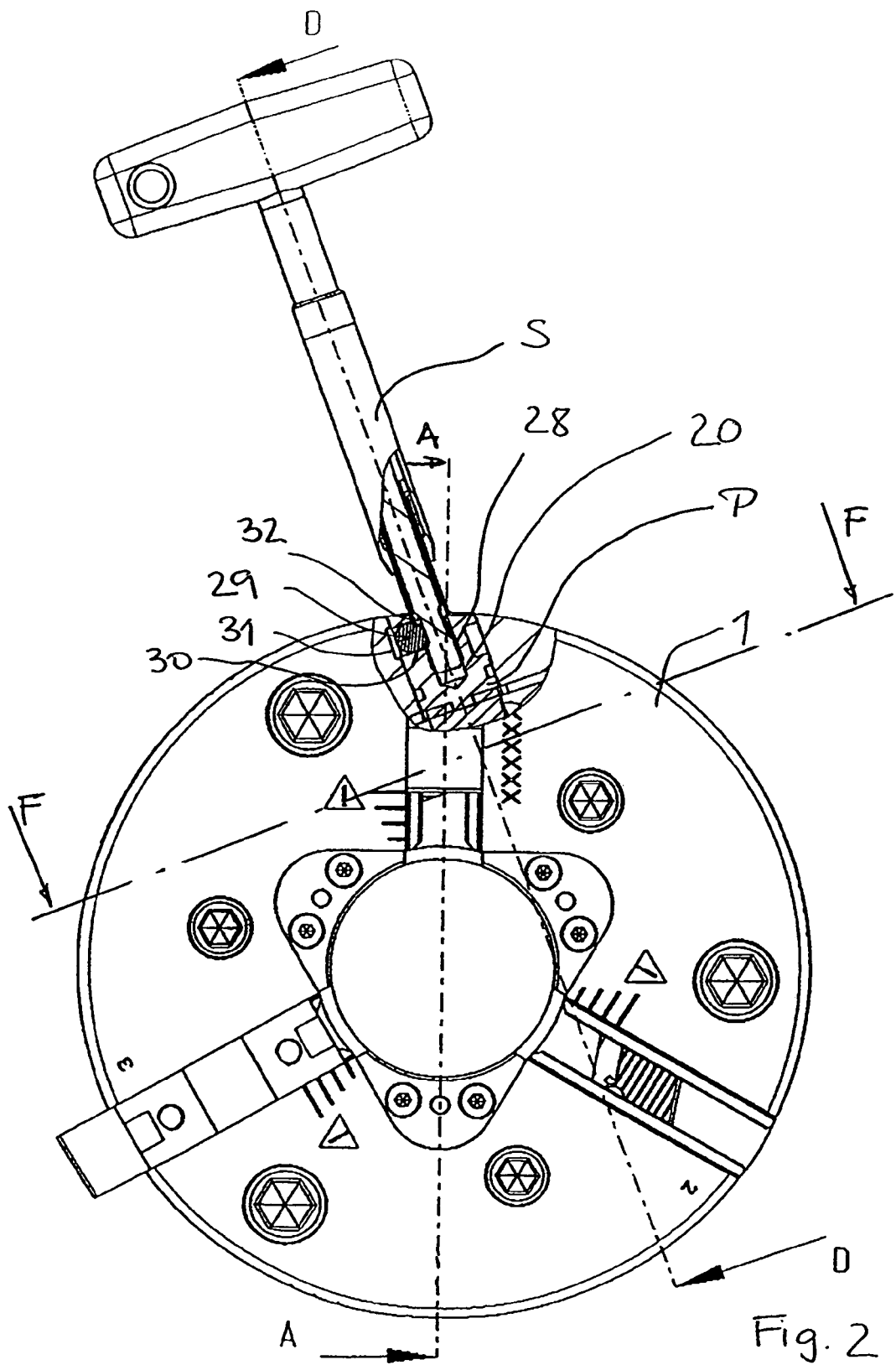
FIG. 2 is a plan view of the clamping chuck of FIG. 1.

To allow eccentric bolt 12 to be rotated, it is connected to a releasing bolt P that is equipped on its external end surface with a key surface 20 into which the coupling element of releasing key S, here in the form of a hex head 28, can be inserted (see FIG. 2).

As already explained previously, coupling attachment 5b is braced by the two compression springs 15 with respect to key bar body 5a, and is pushed upward toward clamping jaw 4. The consequences of this are on the one hand that the spring force of compression springs 15 must be overcome in order to disengage coupling attachment 5b from its engagement with clamping jaw 4 by way of a rotation of eccentric bolt 12, but on the other hand that by way of the return force of compression springs 15, coupling attachment 5b is also automatically raised again, with a rotation of eccentric bolt 12, when an operator lets go of the rotating tool. The arrangement is such that compression springs 15 rotate eccentric bolt 12 not completely back into the starting position, but only sufficiently far that an overlap, but not complete engagement, of tooth sets 7, 8 takes place. This ensures that clamping jaw 4 can be pulled out of jaw guide 3 only as long as the operator is holding the rotating tool in place, i.e. the jaw change is in all cases intentional.

For safety reasons, provision is made according to the present invention that releasing key S for actuating eccentric bolt 12 can be pulled out of chuck body 1 only if eccentric bolt 12 is in its starting position (operating position) which corresponds to the upper working position of key bar 5.

Provided for this purpose is a locking device that is known per se and is depicted in FIG. 2. This locking device encompasses a ball 29 that is arranged at a transverse bore 30 of releasing bolt P; in its starting position as depicted in FIG. 2, it can escape radially outward into a recess 31 of jaw body 1, but in other rotational positions it is prevented by chuck body 1 from thus escaping, and is pushed radially inward into key surface 20 of releasing bolt P, where it comes into engagement with a peripheral groove 32 of the inserted releasing key S in order to immobilize the latter on chuck body 1.

Additionally provided, according to the present invention, are locking means intended to prevent eccentric bolt 12 from being brought into its starting or operating position if a clamping jaw 4 is not inserted in prescribed fashion into the corresponding jaw guide 3 of chuck body 1.

These locking means will be explained below with reference to FIGS. 6 through 10, which show a key bar 5 in accordance with the present invention. According thereto, the locking means encompass firstly a snap-lock pin 21 that is held displaccably in a passthrough bore 22 that extends, parallel to the direction of motion of coupling attachment 5b, from tooth set 7 of coupling attachment 5b downward through coupling attachment 5b and key bar body 5a to transverse bore 13 in which eccentric bolt 12 is arranged. Snap-lock pin 21 can emerge upward out of passthrough bore 22 into the region of tooth sets 7, an upper final position being defined by corresponding axial stop surfaces 14 on snap-lock pin 21 and on passthrough bore 22. The diameters of pusher element 23 and of passthrough bore 22 are correspondingly coordinated with one another. Also part of the locking means is a pusher element 23 which is arranged slidably in a bore 24 of eccentric bolt 12 and by means of which a compression spring element 25, braced in bore 24, is pushed outward.

Figure 7:
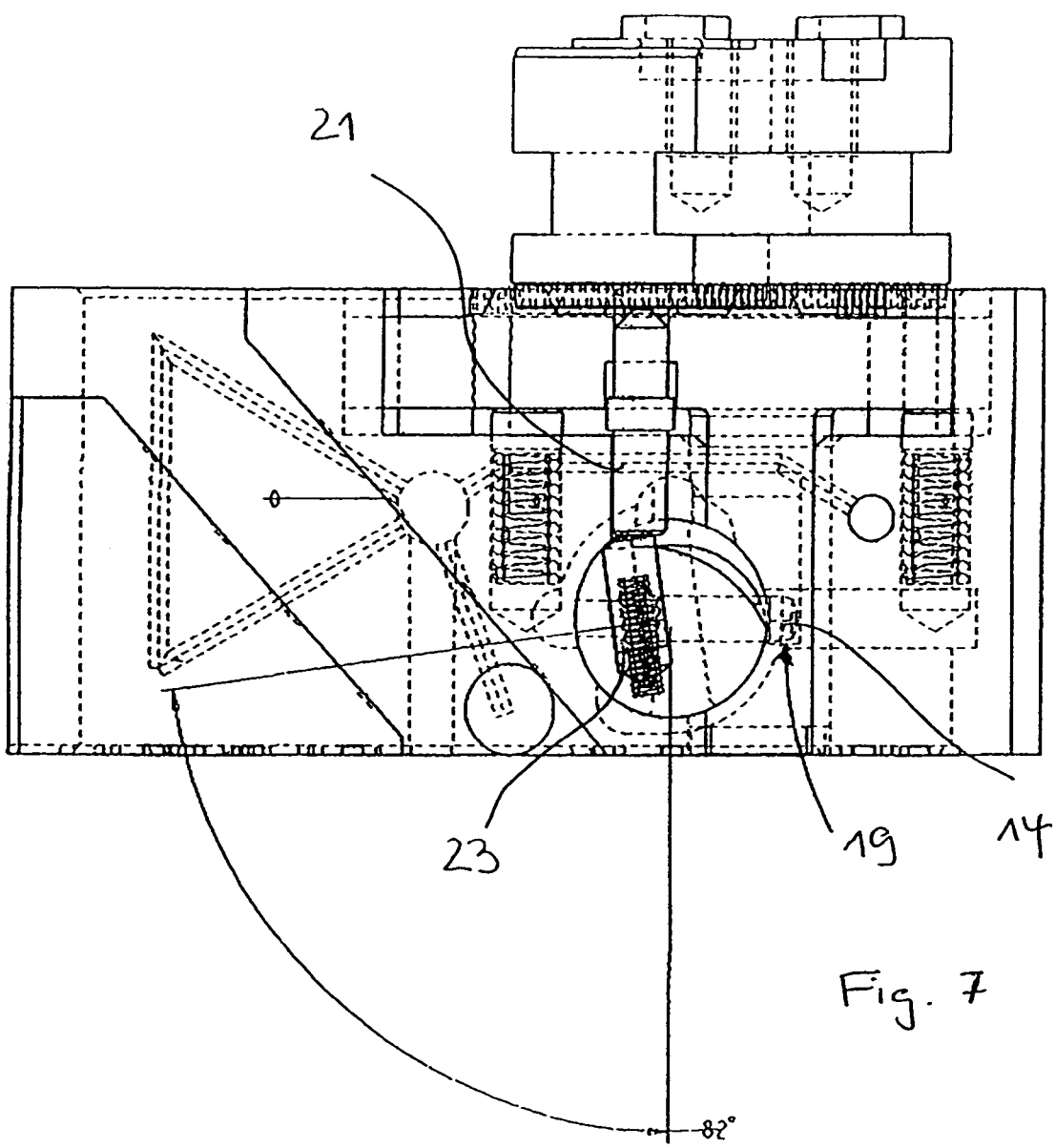
FIG. 7 shows the key bar of FIG. 6 after the eccentric bolt has been rotated 82° clockwise.
Figure 8:
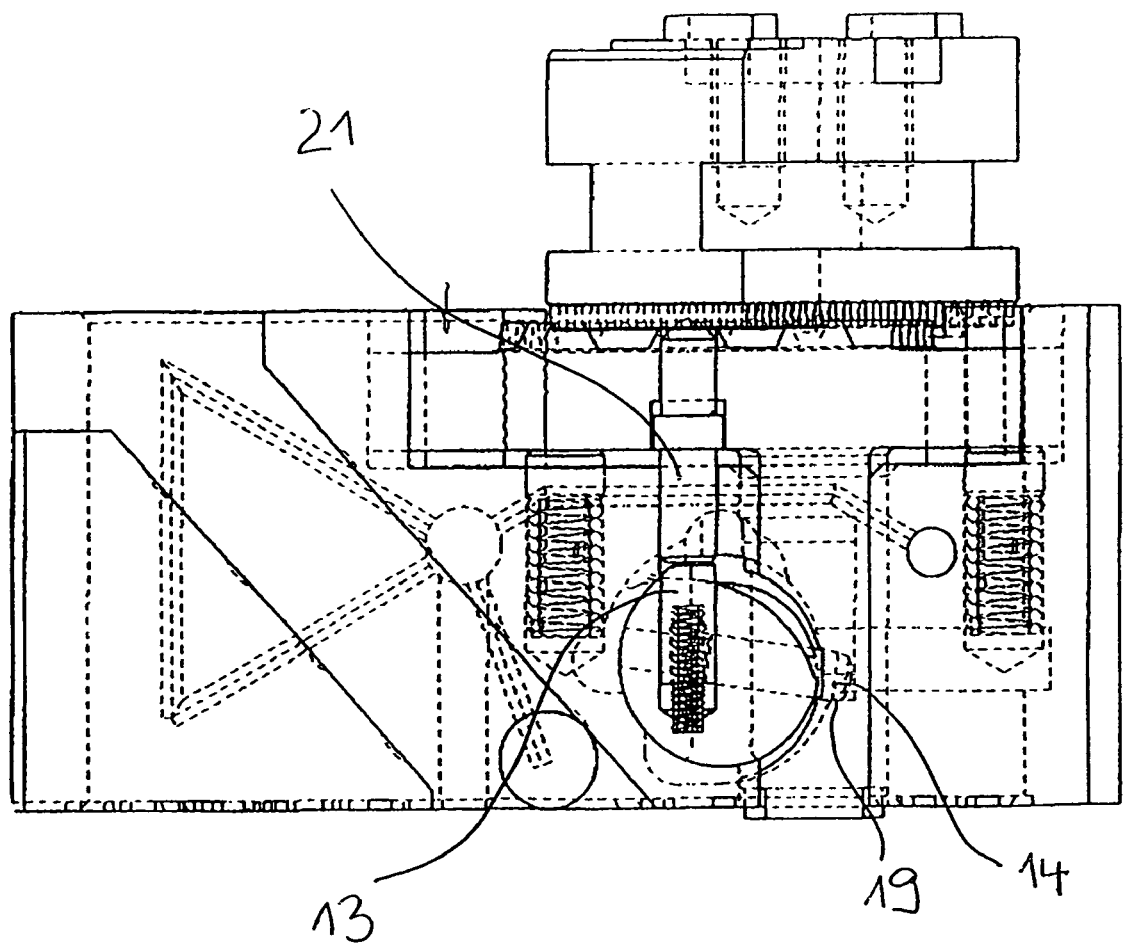
FIG. 8 shows the key bar of FIG. 7 after the eccentric bolt has been rotated 90° clockwise.

The positions of bore 24 in eccentric bolt 12 and of passthrough bore 22 for snap-lock pin 21 are coordinated with one another so that in a predefined rotational position of eccentric bolt 12—i.e., in the embodiment depicted, in the position depicted in FIG. 8, in which eccentric bolt 12 is rotated 90° clockwise with respect to the starting position depicted in FIG. 7—bores 22, 24 are located opposite one another and are aligned coaxially with one another, and pusher element 23 can be pushed into passthrough bore 22 by the spring force of compression spring element 25.

Figure 10:
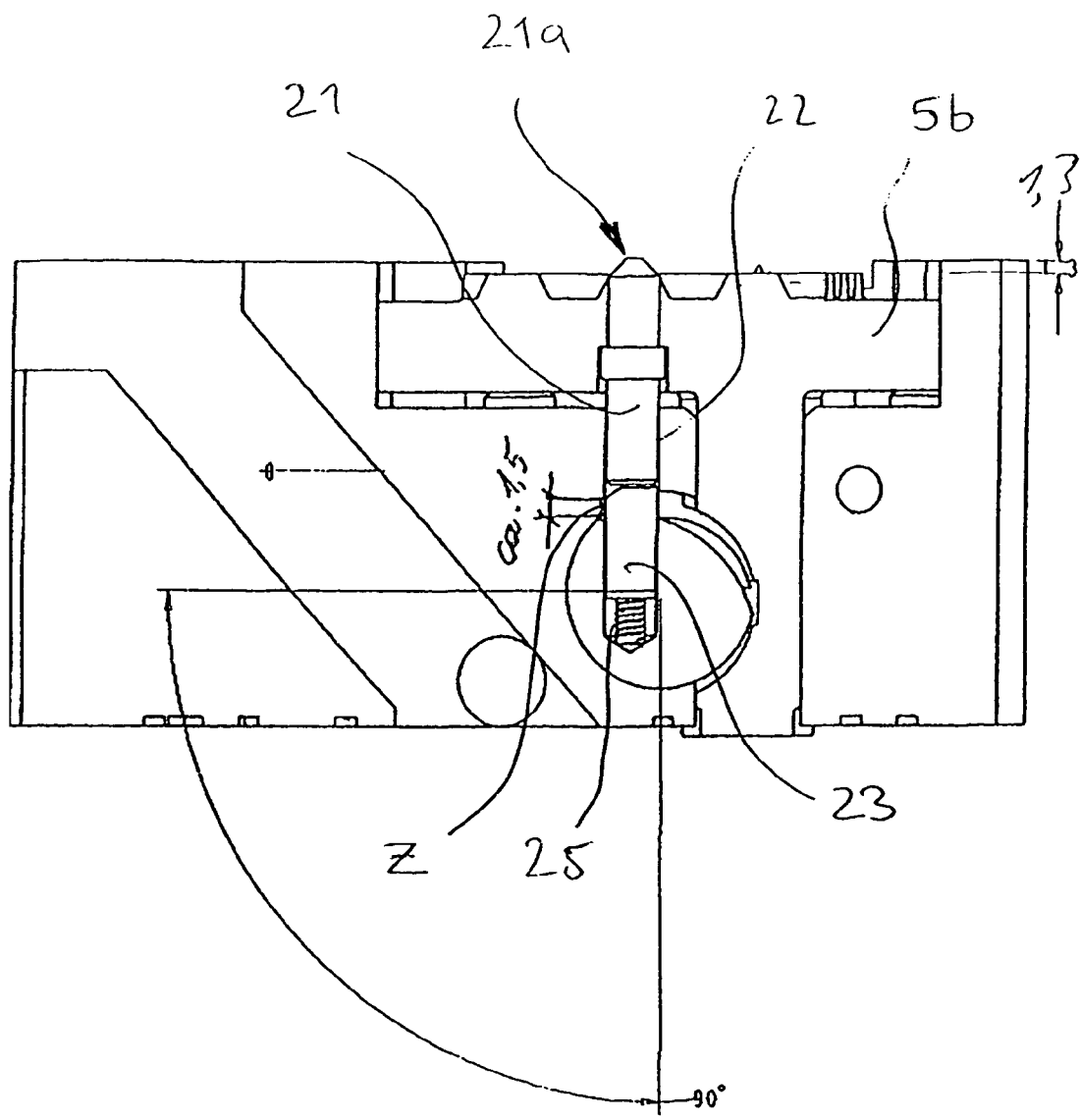
FIG. 10 shows the key bar of FIG. 7 after the eccentric bolt has been rotated 90° clockwise, but without the clamping jaw.

As is evident from a comparison of FIGS. 8 and 10, an entry of pusher element 23 into passthrough bore 22 is possible only if snap-lock pin 21 can emerge upward out of coupling attachment 5b. This is the case only if the opening of passthrough bore 22 is clear in the region of tooth set 7, as shown in FIG. 10, and is not closed off by a clamping jaw 4, as shown in FIG. 10. In other words, pusher element 23 cannot enter passthrough bore 22 if a clamping jaw is correctly inserted into the corresponding jaw guide 3. Entry is thus possible only if a clamping jaw 4 is not inserted, or is not inserted far enough that it covers passthrough bore 22, i.e. if an incorrect operating state exists. In this case the engagement of pusher element 23 into passthrough bore 22 prevents eccentric bolt 12 from being rotated back into its starting position. What occurs concretely is contact of pusher element 23 against the wall of passthrough bore 22 at point Z shown in FIG. 10.

The operation of changing a clamping jaw 4 will be explained below with reference to FIGS. 6 through 10.

Figure 6:
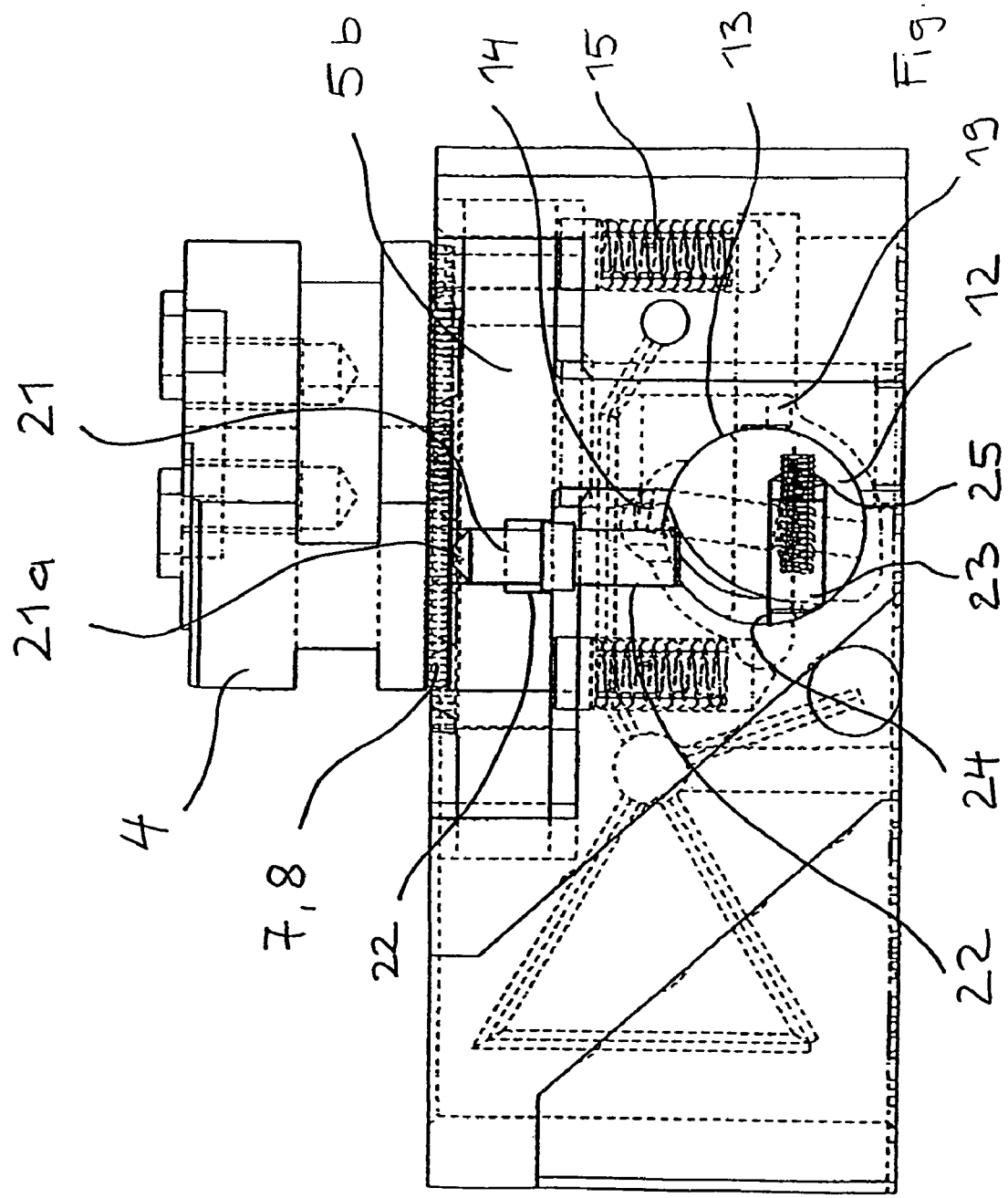
FIG. 6 shows the key bar, in section along line VII-VII in FIG. 5, in the working position.

FIG. 6 shows the starting or operating position, in which coupling attachment 5b of key bar 5 is in its upper working position and is in engagement with a clamping jaw 4 that is inserted into the corresponding jaw guide 3 of clamping chuck 1.

Figure 9:
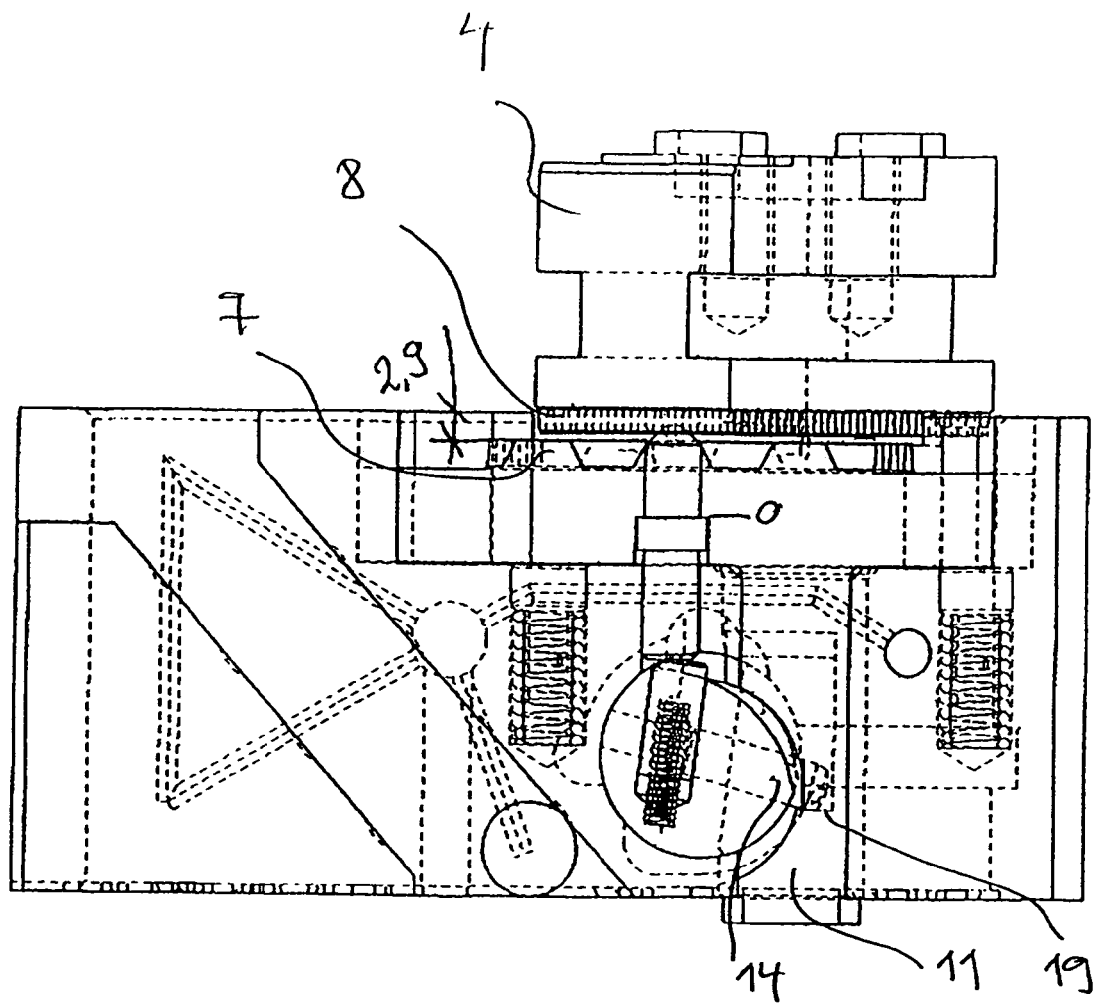
FIG. 9 shows the key bar of FIG. 7 after the eccentric bolt has been rotated through the maximum travel of 97°.

In order to change clamping jaw 4, eccentric bolt 12 is rotated approximately 97°, by means of a releasing key S, out of the starting position depicted in FIG. 6 into the final position depicted in FIG. 9. As already described, after a rotation angle of approximately 80° a first contact takes place between pin 14 and the corresponding countersurface 19 of guide bolt 11, in such a way that upon further rotation, coupling attachment 5 is pushed downward until tooth set 7 of key bars 5 is pulled completely out of counter-tooth set 8 of clamping jaw 4.

In the context of this rotation, at a rotation angle of approximately 82° pusher element 23 comes into contact with snap-lock pin 21, as indicated in FIG. 7. Upon a further rotation into the position shown in FIG. 8 (90°), snap-lock pin 21 is pushed upward by the force of compression spring element 25, although clamping jaw 4 prevents snap-lock pin 21 from being able to emerge upward out of coupling attachment 5b. When eccentric bolt 12 is rotated further into the final position depicted in FIG. 9, coupling attachment 5b moves farther downward relative to coupling attachment 5b until tooth sets 7, 8 have separated. In this final position, clamping jaw 4 can be pulled out of the corresponding jaw guide 3 in chuck body 1, and a new one inserted. When a new clamping jaw 4 is inserted, eccentric bolt 12 can be rotated back into its starting position in a reversal of the procedure previously described.

If, as depicted in FIG. 10, there is no clamping jaw 4 inserted, eccentric bolt 12 can be rotated back only as far as the position depicted in FIG. 10, in which pusher element 23 and passthrough bore 22 are located opposite one another. In this position, pusher element 23 is pushed upward into passthrough bore 22 by the return force of compression spring element 25, snap-lock pin 21 being pushed upward out of coupling attachment 5b. In this position, the engagement between pusher element 23 and passthrough bore 22 at point Z prevents any further backward rotation of eccentric bolt 23.

The invention claimed is:

1. A powered clamping chuck for machine tools having a chuck body (1) and several clamping jaws (4) that are arranged movably in radial jaw guides (3) of the chuck body (1) and are displaceable together, by means of a drive, radially with respect to a chuck axis (A), the drive including key bars (5) that are slidably guided transversely to the chuck axis (A) for displacement of the clamping jaws (4) in the chuck body (1) and each comprise a tooth set (7) that is in engagement with a corresponding counter-tooth set (8) on an associated clamping jaw (4); a positioning mechanism being provided that comprises a releasing bolt (P) mounted rotatably in the chuck body (1) and a releasing key (S) that can be coupled to the releasing bolt (P) in order to displace, by way of a rotation of the releasing bolt (P), the key bar (5) or a coupling attachment (5b), comprising the tooth set (7), of the key bar (5) parallel to the chuck axis (A) between an upper working position and a lower jaw changing position in which the tooth set (7) of the key bar (5) is pulled back out of the counter-tooth set (8) of the clamping jaw (4) and the latter can be removed radially from the chuck body; and a locking device being provided which locks the releasing key (S) on the releasing bolt (P) and permits disengagement of the releasing key (S) only in the working position of the key bar (5), wherein the key bar (5) has locking means that allow a rotation of the releasing bolt (P) out of the rotational position corresponding to the lower jaw changing position of the key bar (5), into the rotational position corresponding to the upper working position of the key bar (5), if the tooth set (7) of the coupling attachment (5b) is in engagement with the counter-tooth set (8) of an associated clamping jaw (4), and that otherwise prevent rotation of the releasing bolt (P) into the rotational position corresponding to the upper working position, wherein the coupling attachment (5b) possesses on its underside a guide extension (11) that engages into a corresponding guide bore (17) of the key bar body, and wherein the coupling attachment (5b) is braced against the key bar body (5a) by way of compression springs (15), optionally via pusher pieces (16), and is pushed toward the clamping jaw (4).

2. The powered clamping chuck as defined in claim 1, wherein the key bars (5) each have a key bar body (5a) and, held thereon, a coupling attachment (5b) on which the tooth set (7) is provided, an eccentric bolt (12) coupled to the releasing bolt (P) being rotatably mounted in a transverse bore (13) of the key bar body (5a) and carrying a radially projecting extension (14) that, upon a rotation of the eccentric bolt (12), comes into engagement with a corresponding countersurface (19) of the coupling attachment (5b) in order to displace the coupling attachment (5b) between the upper working position and the lower jaw changing position.

3. A powered clamping chuck for machine tools having a chuck body (1) and several clamping jaws (4) that are arranged movably in radial jaw guides (3) of the chuck body (1) and are displaceable together, by means of a drive, radially with respect to a chuck axis (A), the drive including key bars (5) that are slidably guided transversely to the chuck axis (A) for displacement of the clamping jaws (4) in the chuck body (1) and each comprise a tooth set (7) that is in engagement with a corresponding counter-tooth set (8) on an associated clamping jaw (4); a positioning mechanism being provided that comprises a releasing bolt (P) mounted rotatably in the chuck body (1) and a releasing key (S) that can be coupled to the releasing bolt (P) in order to displace, by way of a rotation of the releasing bolt (P), the key bar (5) or a coupling attachment (5b), comprising the tooth set (7), of the key bar (5) parallel to the chuck axis (A) between an upper working position and a lower jaw changing position in which the tooth set (7) of the key bar (5) is pulled back out of the counter-tooth set (8) of the clamping jaw (4) and the latter can be removed radially from the chuck body; and a locking device being provided which locks the releasing key (S) on the releasing bolt (P) and permits disengagement of the releasing key (S) only in the working position of the key bar (5), the key bar (5) having locking means that allow a rotation of the releasing bolt (P) out of the rotational position corresponding to the lower jaw changing position of the key bar (5), into the rotational position corresponding to the upper working position of the key bar (5), if the tooth set (7) of the coupling attachment (5b) is in engagement with the counter-tooth set (8) of an associated clamping jaw (4), and that otherwise prevent rotation of the releasing bolt (P) into the rotational position corresponding to the upper working position, and the key bars (5) each having a key bar body (5a) and, held thereon, a coupling attachment (5b) on which the tooth set (7) is provided, an eccentric bolt (12) coupled to the releasing bolt (P) being rotatably mounted in a transverse bore (13) of the key bar body (5a) and carrying a radially projecting extension (14) that, upon a rotation of the eccentric bolt (12), comes into engagement with a corresponding countersurface (19) of the coupling attachment (5b) in order to displace the coupling attachment (5b) between the upper working position and the lower jaw changing position, wherein the locking means include a snap-lock pin (21) that is held slidably in a passthrough bore (22) which extends, parallel to the direction of motion of the coupling attachment (5b), from the tooth set (7) of the coupling attachment (5b) though the coupling attachment (5b) and the key bar body (5a) to the transverse bore (13) in which the eccentric bolt (12) is arranged; and the locking means furthermore comprise a pusher element (23) that is arranged slidably in a bore (24) of the eccentric bolt (12) and is pushed outward by a compression spring element (25) braced in the bore (24); the bore (24) of the eccentric bolt (12) and the passthrough bore (22) in which the snap-lock pin (21) is held being located opposite one another in a predefined rotational position of the eccentric bolt (12), so that the pusher element (23) is pushed by the preload force of the compression spring element (25) into the passthrough bore (22) and pushes the snap-lock pin (21) out of the coupling attachment (5b); a rotation of the eccentric bolt (12) back into the starting position, and thus a return of the coupling attachment (5b) to its working position, then being prevented by the engagement of the pusher element (23) into the passthrough bore (22); and the snap-lock pin (21) being prevented from emerging from the key bar (5) by the counter-tooth set (8) of a clamping jaw (4) that is mounted on the key bar (5) and closes off the passthrough bore (22), so that the pusher element (23) remains outside the passthrough bore (22) and the eccentric bolt (12) can be rotated back into its starting position.

4. A powered clamping chuck for machine tools having a chuck body (1) and several clamping jaws (4) that are arranged movably in radial jaw guides (3) of the chuck body (1) and are displaceable together, by means of a drive, radially with respect to a chuck axis (A), the drive including key bars (5) that are slidably guided transversely to the chuck axis (A) for displacement of the clamping jaws (4) in the chuck body (1) and each comprise a tooth set (7) that is in engagement with a corresponding counter-tooth set (8) on an associated clamping jaw (4); a positioning mechanism being provided that comprises a releasing bolt (P) mounted rotatably in the chuck body (1) and a releasing key (S) that can be coupled to the releasing bolt (P) in order to displace, by way of a rotation of the releasing bolt (P), the key bar (5) or a coupling attachment (5b), comprising the tooth set (7), of the key bar (5) parallel to the chuck axis (A) between an upper working position and a lower jaw changing position in which the tooth set (7) of the key bar (5) is pulled back out of the counter-tooth set (8) of the clamping jaw (4) and the latter can be removed radially from the chuck body; and a locking device being provided which locks the releasing key (S) on the releasing bolt (P) and permits disengagement of the releasing key (S) only in the working position of the key bar (5), the key bar (5) having locking means that allow a rotation of the releasing bolt (P) out of the rotational position corresponding to the lower jaw changing position of the key bar (5), into the rotational position corresponding to the upper working position of the key bar (5), if the tooth set (7) of the coupling attachment (5b) is in engagement with the counter-tooth set (8) of an associated clamping jaw (4), and that otherwise prevent rotation of the releasing bolt (P) into the rotational position corresponding to the upper working position, and the key bars (5) each having a key bar body (5a) and, held thereon, a coupling attachment (5b) on which the tooth set (7) is provided, an eccentric bolt (12) coupled to the releasing bolt (P) being rotatably mounted in a transverse bore (13) of the key bar body (5a) and carrying a radially projecting extension (14) that, upon a rotation of the eccentric bolt (12), comes into engagement with a corresponding countersurface (19) of the coupling attachment (5b) in order to displace the coupling attachment (5b) between the upper working position and the lower jaw changing position, wherein the locking means include a snap-lock pin (21) that is held slidably in a passthrough bore (22) which extends, parallel to the direction of motion of the coupling attachment (5b), from the tooth set (7) of the coupling attachment (5b) through the coupling attachment (5b) and the key bar body (5a) to the transverse bore (13) in which the eccentric bolt (12) is arranged; and the locking means furthermore comprise a pusher element (23) that is arranged slidably in a bore (24) of the eccentric bolt (12) and is pushed outward by a compression spring element (25) braced in the bore (24); the bore (24) of the eccentric bolt (12) and the passthrough bore (22) in which the snap-lock pin (21) is held being located opposite one another in a predefined rotational position of the eccentric bolt (12), so that the pusher element (23) is pushed by the preload force of the compression spring element 25 into the passthrough bore (22) and pushes the snap-lock pin (21) out of the coupling attachment (5b); a rotation of the eccentric bolt (12) back into the starting position, and thus a return of the coupling attachment (5b) to its working position, then being prevented by the engagement of the pusher element (23) into the passthrough bore (22); and the snap-lock pin (21) being prevented from emerging from the key bar (5) by the counter-tooth set (8) of a clamping jaw (4) that is mounted on the key bar (5) and closes off the passthrough bore (22), so that the pusher element (23) remains outside the passthrough bore (22) and the eccentric bolt (12) can be rotated back into its staffing position, wherein the pusher element (23) is of beveled or rounded configuration in the region of its end surface (23a) that comes into contact with the snap-lock pin (21).

5. A key bar having a key bar body (5a) and, held thereon, a coupling attachment (5b) on whose upper side a tooth set (7) is provided, an eccentric bolt (12) being rotatably mounted in a transverse bore (13) of the key bar body (5a) and carrying a radially projecting extension (14) that, upon a rotation of the eccentric bolt (12), comes into engagement with a corresponding countersurface (19) of the coupling attachment (5b) in order to displace the latter between an upper working position and an lower jaw changing position, wherein the key bar (5) has locking means that allow a rotation of a releasing bolt (P) out of the rotational position corresponding to the lower jaw changing position of the key bar (5), into the rotational position corresponding to the upper working position of the key bar (5), if the tooth set (7) of the coupling attachment (5b) is in engagement with the counter-tooth set (8) of an associated clamping jaw (4), and that otherwise prevent rotation of the releasing bolt (P) into the rotational position corresponding to the upper working position, wherein the coupling attachment (5b) possesses on its underside a guide extension (11) that engages into a corresponding guide bore (17) of the key bar body (5a), and wherein the coupling attachment (5b) is braced against the key bar body (5a) by way of compression springs (15), optionally via pusher pieces (16), and is pushed toward the clamping jaw (4).

6. A key bar having a key bar body (5a) and, held thereon, a coupling attachment (5b) on whose upper side a tooth set (7) is provided, an eccentric bolt (12) being rotatably mounted in a transverse bore (13) of the key bar body (5a) and carrying a radially projecting extension (14) that, upon a rotation of the eccentric bolt (12), comes into engagement with a corresponding countersurface (19) of the coupling attachment (5b) in order to displace the latter between an upper working position and a lower jaw changing position, wherein the key bar (5) has locking means that allow a rotation of a releasing bolt (P) out of the rotational position corresponding to the lower jaw changing position of the key bar (5), into the rotational position corresponding to the upper working position of the key bar (5), if the tooth set (7) of the coupling attachment (5b) is in engagement with the counter-tooth set (8) of an associated clamping jaw (4), and that otherwise prevent rotation of the releasing bolt (P) into the rotational position corresponding to the upper working position, and wherein the locking means include a snap-lock pin (21) that is held slidably in a passthrough bore (22) which extends, parallel to the direction of motion of the coupling attachment (5b), from the tooth set (7) of the coupling attachment (5b) through the coupling attachment (5b) and the key bar body (5a) to the transverse bore (13) in which the eccentric bolt (12) is arranged; and the locking means furthermore comprise a pusher element (23) that is arranged slidably in a bore (24) of the eccentric bolt (12) and is pushed outward by a compression spring element (25) braced in the bore (24); the bore (24) of the eccentric bolt (12) and the passthrough bore (22) in which the snap-lock pin (21) is held being located opposite one another in a stipulated rotational position of the eccentric bolt (12), so that the pusher element (23) is pushed by the preload force of the compression spring element (25) into the passthrough bore (22) and pushes the snap-lock pin (21) out of the coupling attachment (5b); a rotation of the eccentric bolt (12) back into the starting position, and thus a return of the coupling attachment (5b) to its working position, then being prevented by the engagement of the pusher element (23) into the passthrough bore (22); and the snap-lock pin (21) being prevented from emerging from the key bar (5) by the counter-tooth set (8) of a clamping jaw (4) that is mounted on the key bar (5) and closes off the passthrough bore (22), so that the pusher element (23) remains outside the passthrough bore (22) and the eccentric bolt (12) can be rotated back into its starting position.

7. A key bar having a key bar body (5a) and, held thereon, a coupling attachment (5b) on whose upper side a tooth set (7) is provided, an eccentric bolt (12) being rotatably mounted in a transverse bore (13) of the key bar body (5a) and carrying a radially projecting extension (14) that, upon a rotation of the eccentric bolt (12), comes into engagement with a corresponding countersurface (19) of the coupling attachment (5b) in order to displace the latter between an upper working position and a lower jaw changing position, wherein the key bar (5) has locking means that allow a rotation of a releasing bolt (P) out of the rotational position corresponding to the lower jaw changing position of the key bar (5), into the rotational position corresponding to the upper working position of the key bar (5), if the tooth set (7) of the coupling attachment (5b) is in engagement with the counter-tooth set (8) of an associated clamping jaw (4), and that otherwise prevent rotation of the releasing bolt (P) into the rotational position corresponding to the upper working position, and wherein the locking means include a snap-lock pin (21) that is held slidably in a passthrough bore (22) which extends, parallel to the direction of motion of the coupling attachment (5b), from the tooth set (7) of the coupling attachment (5b) through the coupling attachment (5b) and the key bar body (5a) to the transverse bore (13) in which the eccentric bolt (12) is arranged; and the locking means furthermore comprise a pusher element (23) that is arranged slidably in a bore (24) of the eccentric bolt (12) and is pushed outward by a compression spring element (25) braced in the bore (24); the bore (24) of the eccentric bolt (12) and the passthrough bore (22) in which the snap-lock pin (21) is held being located opposite one another in a stipulated rotational position of the eccentric bolt (12), so that the pusher element (23) is pushed by the preload force of the compression spring element (25) into the passthrough bore (22) and pushes the snap-lock pin (21) out of the coupling attachment (5b); a rotation of the eccentric bolt (12) back into the starting position, and thus a return of the coupling attachment (5b) to its working position, then being prevented by the engagement of the pusher element (23) into the passthrough bore (22); and the snap-lock pin (21) being prevented from emerging from the key bar (5) by the counter-tooth set (8) of a clamping jaw (4) that is mounted on the key bar (5) and closes off the passthrough bore (22), so that the pusher element (23) remains outside the passthrough bore (22) and the eccentric bolt (12) can be rotated back into its starting position, wherein the pusher element (23) is of beveled or rounded configuration in the region of its end surface (23a) that comes into contact with the snap-lock pin (21).

* * * * *